US008746196B2

(12) United States Patent
Schwarz et al.

(10) Patent No.: US 8,746,196 B2
(45) Date of Patent: Jun. 10, 2014

(54) LASER SPARK PLUG FOR AN INTERNAL COMBUSTION ENGINE

(75) Inventors: Hans-Jochen Schwarz, Stuttgart (DE); Rene Hartke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 241 days.

(21) Appl. No.: 13/376,126

(22) PCT Filed: May 26, 2010

(86) PCT No.: PCT/EP2010/057198
§ 371 (c)(1), (2), (4) Date: Feb. 22, 2012

(87) PCT Pub. No.: WO2010/139576
PCT Pub. Date: Dec. 9, 2010

(65) Prior Publication Data

US 2012/0145107 A1 Jun. 14, 2012

(30) Foreign Application Priority Data

Jun. 5, 2009 (DE) ........................ 10 2009 026 799

(51) Int. Cl.
*F02P 23/04* (2006.01)
*G02F 1/33* (2006.01)

(52) U.S. Cl.
USPC ........................................ 123/143 B; 385/10

(58) Field of Classification Search
USPC ........................................ 123/143 B; 385/10
See application file for complete search history.

(56) References Cited

U.S. PATENT DOCUMENTS

| | | | | |
|---|---|---|---|---|
| 6,981,406 | B2 * | 1/2006 | Willner | 73/114.18 |
| 7,395,699 | B2 * | 7/2008 | Olcmen et al. | 73/114.23 |
| 7,619,742 | B2 * | 11/2009 | Sanders | 356/451 |
| 7,810,462 | B2 * | 10/2010 | Herden et al. | 123/143 B |
| 2002/0154860 | A1 * | 10/2002 | Fernald et al. | 385/37 |
| 2004/0057645 | A1 * | 3/2004 | Willner | 385/12 |
| 2004/0245441 | A1 * | 12/2004 | Pieterse et al. | 250/227.14 |
| 2006/0206255 | A1 * | 9/2006 | Olcmen et al. | 701/114 |

FOREIGN PATENT DOCUMENTS

| | | | |
|---|---|---|---|
| DE | 196 09 276 | | 8/1997 |
| DE | 103 50 101 | | 5/2004 |
| JP | 2006 242038 | * | 9/2006 |
| JP | 2006/242038 | | 3/2007 |
| WO | WO 2008/006638 | * | 1/2008 |

OTHER PUBLICATIONS

"Bragg-Gitter" Funkschau, Weka Fachzeitschriften Verlag, Poing, DE, vol. 72, No. 13, Jun. 11, 1999, pp. 59-60, XP000913218, ISSN: 0016-2841.

International Search Report for PCT/EP2010/057198, dated Sep. 1, 2010.

* cited by examiner

*Primary Examiner* — Erick Solis
(74) *Attorney, Agent, or Firm* — Kenyon & Kenyon LLP

(57) ABSTRACT

A laser spark plug is described for an internal combustion engine. According to the system, at least one volume Bragg grating element is situated in a beam path of the laser spark plug.

11 Claims, 4 Drawing Sheets

LASER SPARK PLUG FOR AN INTERNAL COMBUSTION ENGINE

FIELD OF THE INVENTION

The present invention relates to a laser spark plug for an internal combustion engine.

BACKGROUND INFORMATION

Comparable to spark plugs used for high-voltage ignition, laser spark plugs are situated in the area of a cylinder head of an internal combustion engine and inject high-energy laser pulses into a combustion chamber assigned to them in order to ignite an air-fuel mixture located in it. Considerable design complexity is required in order to ensure a reliable operation of a laser spark plug, including optical components integrated into it under the surrounding conditions (great temperature fluctuations, vibrations, among other things) prevailing in the area of the cylinder head.

A laser-based ignition system for an internal combustion engine in which a converging lens is situated in a laser spark plug is already discussed in JP 2006-242038 A. In addition, the known laser spark plug has a deformation arrangement which is configured for deforming the converging lens. In this way, it is possible to vary the ignition location of the known laser ignition system.

A disadvantage of the known laser-based ignition system is the design complexity associated with the provision of the deformation arrangement for the targeted deformation of the converging lens. Considerable drive energy is required for the deformation arrangement in order to deform the relatively massive converging lens in the desired manner for setting the focus position.

SUMMARY OF THE INVENTION

Accordingly, an object of the exemplary embodiments and/or exemplary methods of the present invention is to improve a laser spark plug of the above-named type in such a way that the possibility for spatial multipoint ignition is present in a combustion chamber of the internal combustion engine with comparatively little design complexity.

In the laser spark plug of the above-named type, this objective is achieved according to the exemplary embodiments and/or exemplary methods of the present invention by positioning at least one volume Bragg grating element in a beam path of the laser spark plug.

The volume Bragg grating, abbreviated as VBG, is made up of a spatially situated optical grating, whose transmission or reflection characteristics for incident electromagnetic radiation are settable by specifying, among other things, a grating constant in a manner known per se. The optical grating is formed by periodically varying the refractive index of a carrier medium containing the VBG.

In order to implement a spatial multipoint ignition, in which it is possible to emit the laser ignition pulses simultaneously to at least two different ignition points, it is provided in a particular variant of the laser spark plug according to the exemplary embodiments and/or exemplary methods of the present invention to configure the volume Bragg grating element as a beam splitter. To that end, the volume Bragg grating element may have at least two different volume Bragg gratings which may be situated in the same volume area of a suitable carrier medium in a manner known per se and have different properties or orientations.

In contrast to the conventional systems having deformable converging lenses, no moving component is provided in this variant of the exemplary embodiments and/or exemplary methods of the present invention, and the integration of multiple volume Bragg gratings allows a very compact design.

According to another variant, the volume Bragg grating element according to the exemplary embodiments and/or exemplary methods of the present invention may also be advantageously integrated directly into a focusing lens and/or a combustion chamber window of the laser spark plug. In these cases, one or multiple volume Bragg gratings are written directly into the relevant components, which also results in a very compact design.

In another very advantageous variant of the exemplary embodiments and/or exemplary methods of the present invention, it is provided that the volume Bragg grating element has a diffraction efficiency that is lower than approximately 95%.

When laser radiation passes through the volume Bragg grating element according to the present invention, the diffraction efficiency of the volume Bragg grating element, selected intentionally according to the exemplary embodiments and/or exemplary methods of the present invention to be lower than 95%, in turn results in multiple partial beams having beam axes diverging from one another, whereby it is possible for the multiple partial beams to be focused onto different ignition points through a downstream focusing lens.

In particular, the volume Bragg grating element may have a diffraction efficiency of approximately 50%, so that in addition to a first laser partial beam, a second laser partial beam, also described as an off-axis beam, is produced when the volume Bragg grating element is properly oriented in relation to the optical axis of a laser device situated in the laser spark plug. The diffraction efficiency is influenced in a manner known per se, by, among other things, an incidence angle of the incident laser radiation and its wavelength. In order to obtain the effects, of the beam splitting described above, the properties of the volume Bragg grating element and its orientation in the laser spark plug must be selected accordingly.

In another very advantageous specific embodiment of the laser spark plug according to the present invention, it is provided that the volume Bragg grating element is situated movably in relation to the optical axis of the laser spark plug, resulting in additional degrees of freedom in the case of a spatial multipoint ignition. For example, controlling a tilt angle between a surface normal of the volume Bragg grating element and the optical axis of the laser spark plug makes it possible to influence the direction of propagation of the laser radiation exiting the volume Bragg grating element, whereby it is advantageously possible for a multipoint ignition to occur sequentially at different ignition points.

In another advantageous variant of the exemplary embodiments and/or exemplary methods of the present invention, the drive arrangement for moving the volume Bragg grating element according to the present invention are situated directly in the laser spark plug. In contrast to conventional systems based on a deformation of converging lenses, comparatively little drive energy is required for the movement according to the present invention of the volume Bragg grating element.

In another specific embodiment of the laser spark plug according to the exemplary embodiments and/or exemplary methods of the present invention, the volume Bragg grating element is situated in such a way that it is diametrically opposed to a face of a laser device situated in the laser spark plug provided for outcoupling the generated laser radiation. The precise angular orientation of the volume Bragg grating element to the outcoupling surface of the laser device or to the optical axis of the laser device required for proper operation of the volume Bragg grating element according to the present invention is achieved advantageously according to the present invention by providing a spacer between the volume Bragg grating element and the laser device. The spacer according to the present invention may have a parallelism of its surfaces of less than approximately 2 μm and may possess an essentially annular geometry, so that laser radiation from the laser device is able to pass through the volume Bragg grating element according to the exemplary embodiments and/or exemplary methods of the present invention. Particularly, the volume Bragg grating element according to the present invention may be supported by spring loading in such a way that in its resting position it is pressed onto the spacer by the spring forces, causing the volume Bragg grating element to assume its required precise parallel position in relation to the outcoupling surface of the laser device.

A drive for the volume Bragg grating element provided according to the present invention in the laser spark plug may be, for example, designed in such a way that it displaces the volume Bragg grating element in its radial exterior area axially against the spring forces, so that the volume Bragg grating element is tilted in relation to the optical axis of the laser device.

In another particular specific embodiment of the laser spark plug according to the present invention, it is provided that the volume Bragg grating element has a location-dependent grating constant and is thus designed as a chirped volume Bragg grating element. The use of a chirped VBG, which advantageously has an increased spectral acceptance in contrast to VBGs having a non-location-dependent grating constant, makes it possible to take into account the relatively great temperature fluctuations occurring in the area of the spark plug, which normally have a negative impact on the wavelength stability of the laser device contained in the laser spark plug.

For generating high-energy laser ignition pulses, the laser spark plug according to the present invention may have a laser-active solid body having a, which may be a passive, Q-switch. The VBG according to the present invention is integratable into the laser-active solid body in a simple manner and is in particular also suitable for operation using high-energy laser pulses, which due to the high power densities, severely reduce the service lives of conventional, dielectric reflective layers.

Additional features, possible applications and advantages of the exemplary embodiments and/or exemplary methods of the present invention ensue from the following description of exemplary embodiments of the present invention which are depicted in the figures of the drawing. All described or depicted features constitute the object of the present invention singly or in any combination, irrespective of their summary in the patent claims or their back-reference as well as irrespective of their wording or depiction in the description or in the drawings.

DETAILED DESCRIPTION

Figure 1:
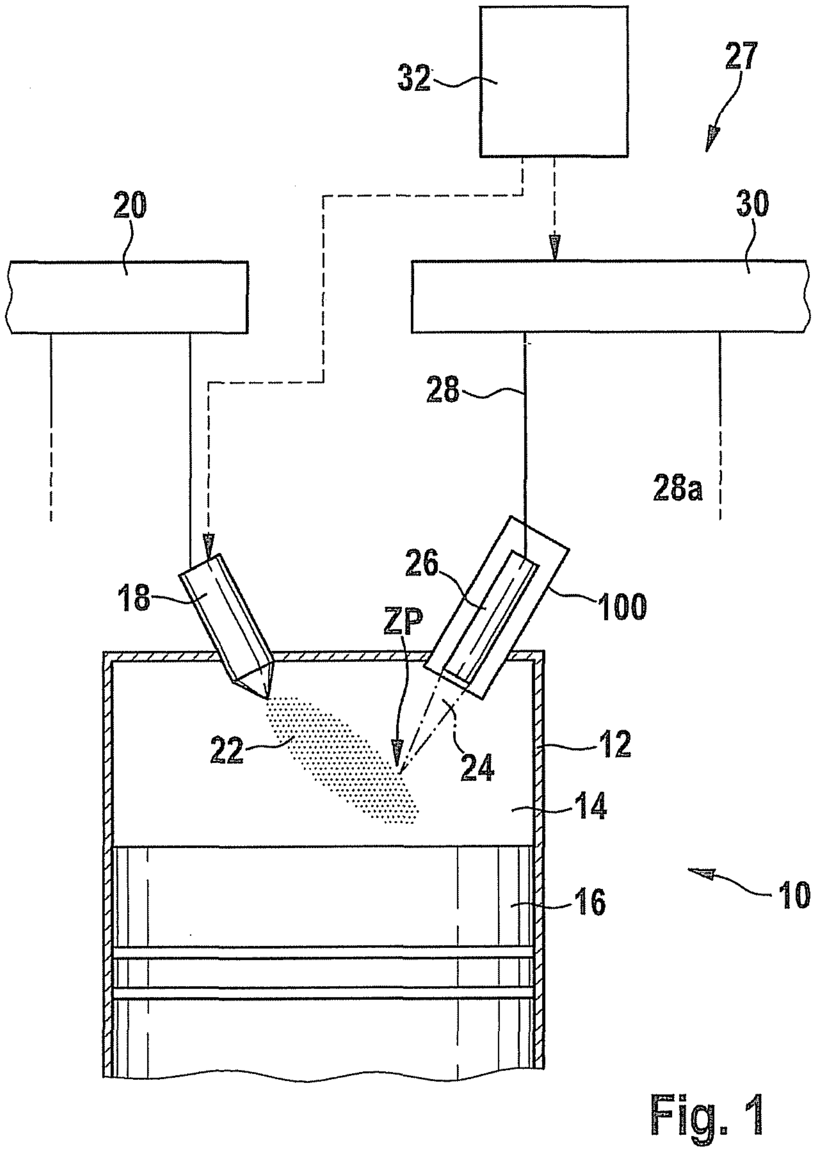
FIG. 1 shows an internal combustion engine having a laser spark plug according to the present invention.

An internal combustion engine is denoted overall in FIG. 1 by reference numeral 10. It is used for driving a motor vehicle, which is not shown. Internal combustion engine 10 includes multiple cylinders, of which only one is denoted by reference numeral 12 in FIG. 1. A combustion chamber 14 of cylinder 12 is delimited by a piston 16. Fuel enters combustion chamber 14 directly through an injector 18 which is connected to a fuel pressure accumulator 20, also referred to as a rail.

Fuel 22 injected into combustion chamber 14 is ignited with the aid of a laser beam 24 which may be emitted onto ignition point ZP in combustion chamber 14 in the form of a laser pulse 24 by a laser spark plug 100 having a laser device 26. To that end, laser device 26 is fed pump light via a fiber optic device 28, the pump light being provided by a pump light source 30. Pump light source 30 is controlled by a control unit 32, which also activates injector 18.

Together with fiber optic device 28 and laser spark plug 100 having laser device 26, pump light source 30 forms a laser-based ignition system 27 of internal combustion engine 10.

Figure 2:
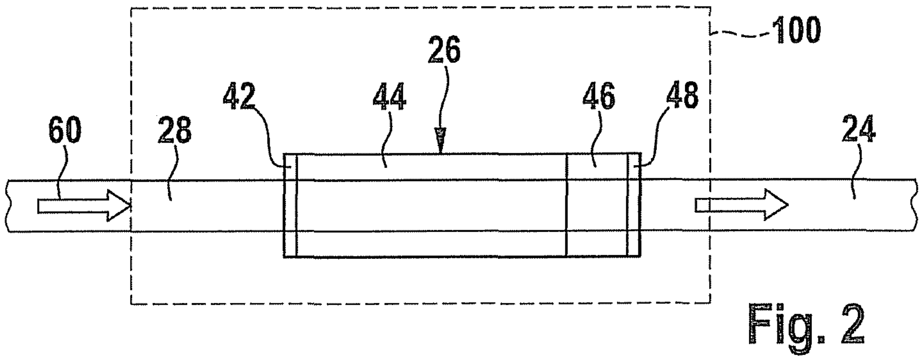
FIG. 2 shows a first specific embodiment of the laser spark plug according to the present invention from FIG. 1 in greater detail.

As is apparent from FIG. 2, laser device 26 also has a passive Q-switch 46 according to the present invention in addition to a laser-active solid body 44, so that components 44, 46 together with an input mirror 42 and an output mirror 48 form a laser oscillator.

The basic function of laser device 26 is as follows: Pump light 60, which is fed to laser device 26 via fiber optic device 28, enters laser-active solid body 44 through input mirror 42 which is transparent for a wavelength of pump light 60. Pump light 60 is absorbed there, resulting in a population inversion. The initially high transmission losses of passive Q-switch 46 prevent a laser oscillation in laser device 26. As the pumping duration increases, the radiation density also increases in the interior of the resonator formed by laser-active solid body 44 and passive Q-switch 46 as well as mirrors 42, 48. Starting from a certain radiation density, passive Q-switch 46 or a saturable absorber of passive Q-switch 46 fades, so that a laser oscillation materializes in the resonator.

This mechanism generates a laser beam 24 in the form of a so-called giant pulse which passes through output mirror 48 and is described as a laser ignition pulse in the following.

Instead of passive Q-switch 46 described above, the use of an active Q-switch is also conceivable.

According to the exemplary embodiments and/or exemplary methods of the present invention, at least one volume Bragg grating element is situated in the beam path of laser spark plug 100. In the present case, output mirror 48 is formed by such a volume Bragg grating element, so that a conventional dielectric reflective coating may advantageously be omitted at this point.

Volume Bragg grating element 48 forming the output mirror may advantageously be integrated directly into laser device 26, for example, by writing a corresponding grating pattern into laser-active solid body 44 or Q-switch 46.

As an alternative to this, volume Bragg grating element 48 may also be designed as a separate component which is situated externally in relation to components 44, 46 or is connectable to laser device 26, for example, by optical contacting or adhesiveless bonding.

In addition to its function as an output mirror, volume Bragg grating element 48 is in the present case designed in such a way that it acts as a beam splitter. In this way, laser pulses 24 generated by laser device 26 are advantageously divided into multiple partial beams. These partial beams may be advantageously bundled on multiple different ignition points in combustion chamber 14 (FIG. 1) of internal combustion engine 10 by a focusing lens (not depicted in FIG. 2) situated downstream from volume Bragg grating element 110.

Figure 3A:
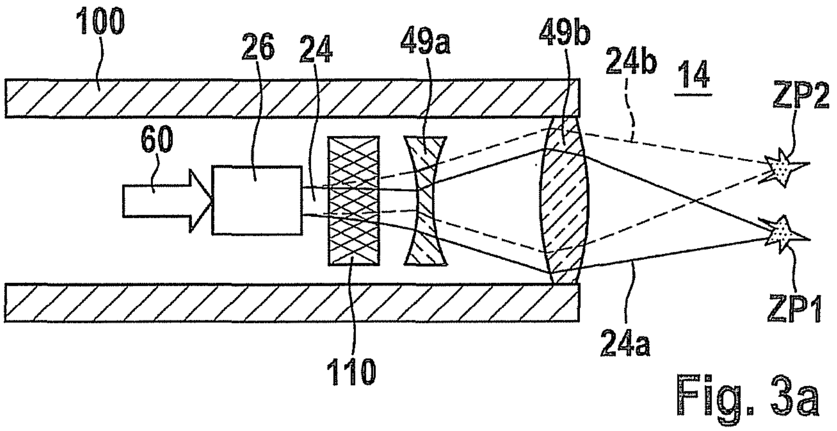
FIG. 3*a* shows a specific embodiment of the laser spark plug according to the present invention having a volume Bragg grating element having multiple volume Bragg gratings.

FIG. 3 shows another specific embodiment of laser spark plug 100 according to the present invention, a volume Bragg grating element 110 situated outside of laser device 26 being provided. Volume Bragg grating element 110 according to FIG. 3*a* has at least two different volume Bragg gratings, so that laser radiation 24 generated by laser device 26 is, as has been already described, divided into two partial beams 24*a*, 24*b*. The integration of the at least two different volume Bragg gratings in volume Bragg grating element 110 according to the present invention is symbolized in FIG. 3*a* by sets of lines extending in two different spatial directions.

As is apparent from FIG. 3*a*, laser radiation 24*a*, 24*b* exiting volume Bragg grating element 110 is initially expanded through a biconcave diverging lens 49*a*, so that it is subsequently focusable through a biconvex converging lens 49*b* situated downstream from diverging lens 49*a* onto ignition points ZP1, ZP2 in combustion chamber 14 of internal combustion engine 10 (FIG. 1). In the present case, converging lens 49*b* simultaneously forms a combustion chamber window which closes off the interior of laser spark plug 100 in relation to combustion chamber 14 of the internal combustion engine.

Figure 3B:
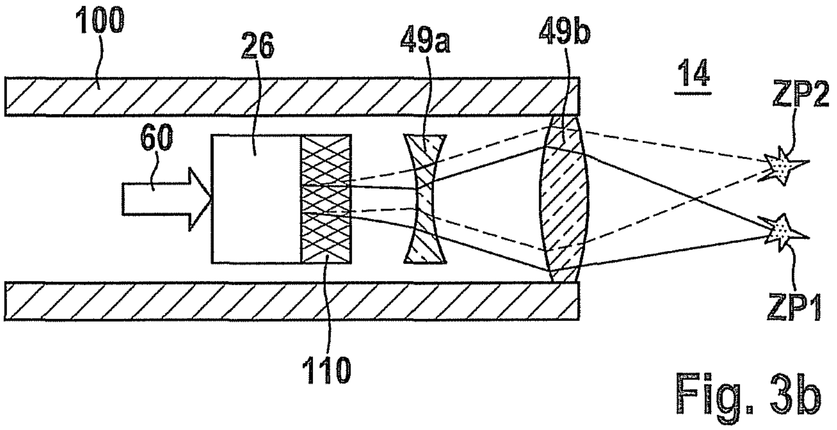
FIG. 3*b* shows another specific embodiment of the laser spark plug according to the present invention having a volume Bragg grating element having multiple volume Bragg gratings.

FIG. 3*b* shows another variant of laser spark plug 100 according to the present invention in which volume Bragg grating element 110 having at least two different volume Bragg gratings is monolithically integrated into laser device 26.

Figure 3C:
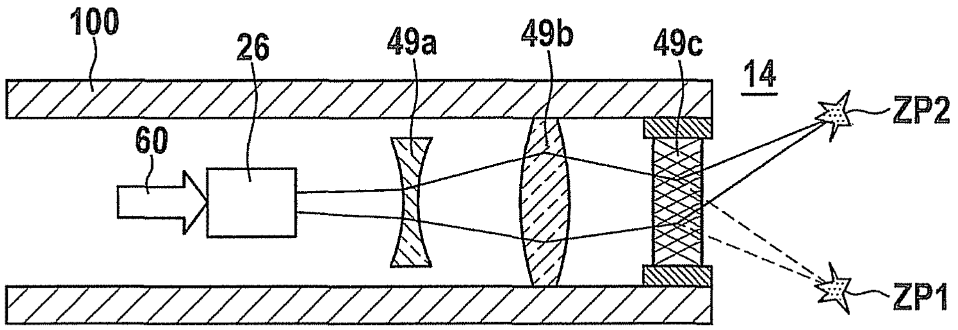
FIG. 3*c* shows another specific embodiment of the laser spark plug according to the present invention having a volume Bragg grating element having multiple volume Bragg gratings.

FIG. 3*c* shows another specific embodiment of laser spark plug 100 according to the present invention in which the at least two volume Bragg gratings are advantageously integrated directly into combustion chamber window 49*c* for implementing a spatial multipoint ignition.

In this variant of the present invention, diverging lens 49*a* and converging lens 49*b* are situated in the interior of laser spark plug 100.

Figure 4A:
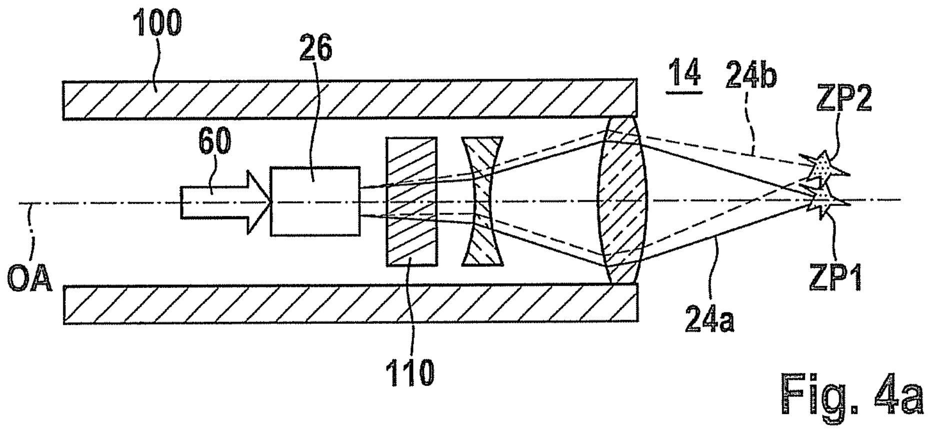
FIG. 4*a* shows a specific embodiment of the laser spark plug according to the present invention having a volume Bragg grating element of reduced diffraction efficiency for generating off-axis laser beams.

FIG. 4 shows another very advantageous specific embodiment of laser spark plug 100 according to the present invention in which a spatial multipoint ignition is advantageously implemented by volume Bragg grating element 110 having a diffraction efficiency lower than approximately 95%. As a result, in addition to primary partial beam 24*a* which is coaxial to optical axis OA of laser device 26, a so-called off-axis partial beam 24*b* is also formed which is focused through the focusing lens, which is not described in greater detail in the present case, onto a second ignition point ZP2 outside of optical axis OA.

The selection of the diffraction efficiency of volume Bragg grating element 110 according to the present invention advantageously makes it possible to direct the laser output to the various laser ignition points ZP1, ZP2.

Figure 4B:
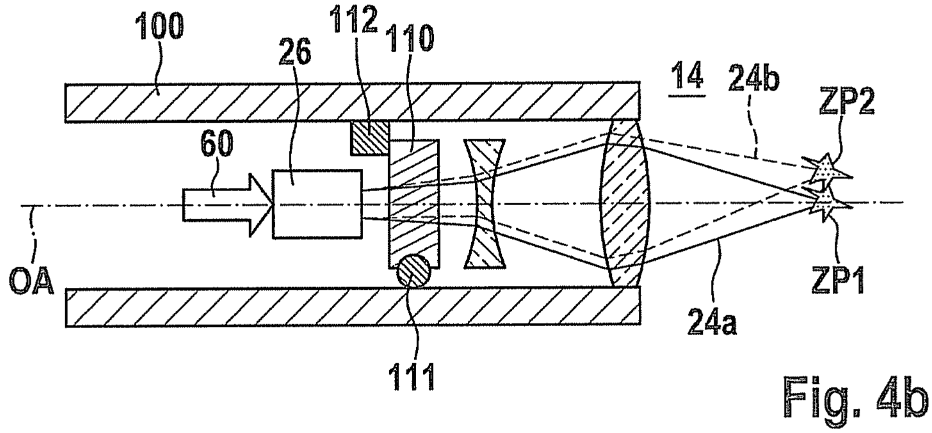
FIG. 4*b* shows another specific embodiment of the laser spark plug according to the present invention having a volume Bragg grating element of reduced diffraction efficiency for generating off-axis laser beams.

FIG. 4*b* shows another very advantageous specific embodiment of laser spark plug 100 according to the present invention, an off-axis laser partial beam 24*b* again being generated by providing a volume Bragg grating element 110 having a low diffraction efficiency of approximately 50. In contrast to the variant of the present invention depicted in FIG. 4*a*, laser spark plug 100 according to FIG. 4*b* has a movably situated volume Bragg grating element 110, which in the present case is supported pivotably on an interior housing wall of laser spark plug 100 with the aid of a pivot joint 111. This makes it possible to tilt volume Bragg grating element 110 driven by drive device 112 advantageously in relation to a face of laser device 26 which outcouples laser radiation 24, so that off-axis laser beam 24*b* is generated when volume Bragg grating element 110 is situated at an appropriate angle in relation to laser device 26 or optical axis OA of the laser spark plug.

This means that the variant of the present invention shown in FIG. 4*b*, a corresponding orientation of volume Bragg grating element 110, which is controllable by drive unit 112, makes it possible to select between a laser ignition only in ignition point ZP1 or also in ignition point ZP2.

In contrast to conventional deformable converging lenses for implementing a spatial multipoint ignition, the configuration according to the present invention of a relatively low drive energy requires a very slight axial adjustment track of drive unit 112 parallel to optical axis OA of laser spark plug 100, which is conditioned by the relatively low angular acceptance of volume Bragg grating element 110.

Figure 5:
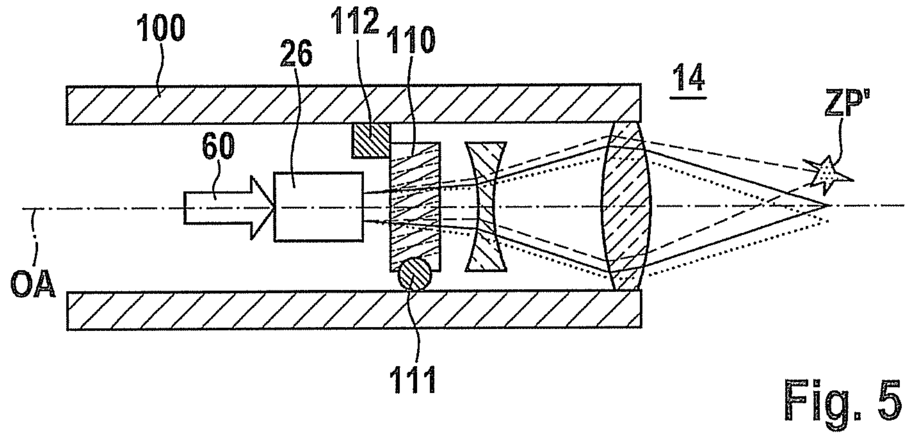
FIG. 5 shows another specific embodiment of a laser spark plug according to the present invention.

FIG. 5 shows another specific embodiment of laser spark plug 100 according to the present invention, volume Bragg grating element 110 may have a diffraction efficiency which is as high as possible, in particular a diffraction efficiency of 99% or more.

Through an appropriate orientation of volume Bragg grating element 110 in relation to laser device 26, an off-axis ignition point ZP' may be implemented, whose position in combustion chamber 14 is a function of the tilt angle between volume Bragg grating element 110 and the face of laser device 26 or optical axis OA assigned to it.

Figure 6:
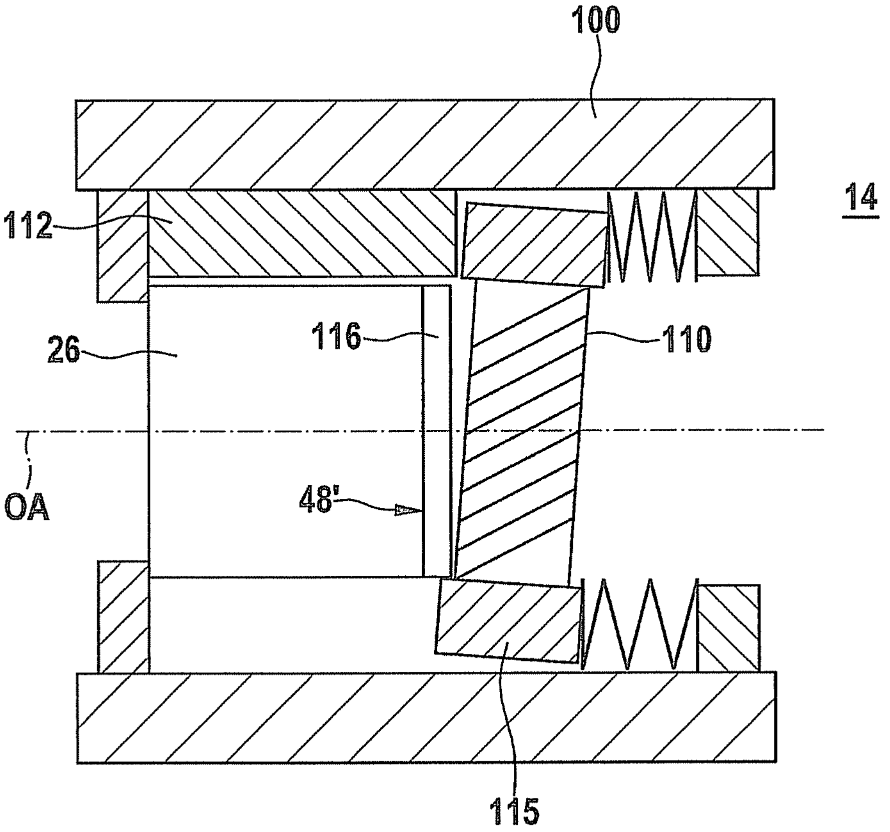
FIG. 6 shows still another specific embodiment of a laser spark plug according to the present invention.

FIG. 6 shows another very advantageous specific embodiment of laser spark plug 100, in which a volume Bragg grating element 110 is movably situated in relation to laser device 26 or its optical axis OA. In the present case, volume Bragg grating element 110 is enclosed by a mounting ring 115, which as shown in FIG. 6 is spring-loaded and is situated in relation to the housing of laser spark plug 100 in such a way that volume Bragg grating element 110 held in mounting ring 115 is located in a flat position in relation to outcoupling surface 48 as long as it is not deflected by drive unit 112 as depicted.

According to the present invention, a spacer 116 is provided in the present case between laser device 26 and its outcoupling surface 48' and the corresponding face of volume Bragg grating element 110. Spacer 116 may, as does mounting ring 115, have an annular geometry, so that the laser radiation generated by laser device 26 may exit through mounting ring 115 onto volume Bragg grating element 110.

Simultaneously, spacer 116 ensures a precise flat position of volume Bragg grating element 110 in relation to laser device 26. To that end, the corresponding faces of spacer 116 may have a parallelism of approximately 2 μm or less.

By providing spacer 116 according to the present invention it is also advantageously ensured that there is no contact between volume Bragg grating element 110 and laser device 26, thus preventing mechanical damage to outcoupling surface 48'. As is apparent from FIG. 6, volume Bragg grating element 110 may be tilted from a resting position in which its longitudinal axis is at a right angle to optical axis OA of laser device 26 via drive unit 112, which may be, for example, a piezoelectric actuator, so that the spatial position of the ignition point in combustion chamber 14 is precisely settable in the manner already described above.

In additional variants of the present invention, volume Bragg grating element 110 may have a location-dependent grating constant in order to increase the spectral acceptance of volume Bragg grating element 110 in a manner known per se.

Volume Bragg grating element 110 according to the exemplary embodiments and/or exemplary methods of the present invention advantageously makes it possible to provide a cost-effective and compact laser spark plug 100, which simultaneously offers spatial and temporal multipoint ignition. Moreover, volume Bragg grating element 110 according to the present invention is advantageously suitable for the high optical pulse outputs occurring in laser ignition and is temperature-stable up to at least approximately 400° C.

What is claimed is:

1. A laser spark plug for a combustion chamber of an internal combustion engine, comprising:

a laser spark plug arrangement; and at least one volume Bragg grating element situated in a beam path of the laser spark plug, wherein the at least one volume Bragg grating element is configured as a beam splitter for dividing laser radiation guided in the laser spark plug into multiple partial beams transmitted to multiple ignition points in the combustion chamber to generate a multipoint ignition.

2. The laser spark plug of claim 1, wherein the at least one volume Bragg grating element has at least two different volume Bragg gratings.

3. The laser spark plug of claim 1, wherein the at least one volume Bragg grating element is integrated into at least one of a focusing lens and a combustion chamber window.

4. The laser spark plug of claim 1, wherein the at least one volume Bragg grating element has a diffraction efficiency which is lower than approximately 95 percent.

5. A laser spark plug for a combustion chamber of an internal combustion engine, comprising:

a laser spark plug arrangement; and at least one volume Bragg grating element situated in a beam path of the laser spark plug, wherein the volume Bragg grating element is configured as a beam splitter for dividing laser radiation guided in the laser spark plug into multiple partial beams transmitted to multiple ignition points in the combustion chamber to generate a multipoint ignition, and wherein the at least one volume Bragg grating element is situated movably in relation to an optical axis of the laser spark plug.

6. The laser spark plug of claim 5, further comprising:

a drive arrangement for moving the at least one volume Bragg grating element.

7. The laser spark plug of claim 5, further comprising:

a spacer, which has an essentially annular geometry, is situated between an outcoupling surface of a laser device situated in the laser spark plug and the volume Bragg grating element, wherein the faces of the spacer provided for contacting the outcoupling surface and the volume Bragg grating element are plane-parallel to one another.

8. The laser spark plug of claim 1, wherein the at least one volume Bragg grating element has a location-dependent grating constant.

9. The laser spark plug of claim 1, wherein the at least one volume Bragg grating element is integrated monolithically into at least one of a laser-active solid body and another optical component situated in the beam path.

10. The laser spark plug of claim 1, wherein a laser-active solid body having a passive Q-switch is integrated into the laser spark plug arrangement.

11. The laser spark system of claim 5, wherein a tilt angle between a surface normal of the at least one volume Bragg grating element and the optical axis of the laser spark plug is varied.

* * * * *